United States Patent
Hwang

(10) Patent No.: US 7,156,958 B2
(45) Date of Patent: Jan. 2, 2007

(54) PREPARATION OF HOLLOW CARBON NANOCAPSULES

(75) Inventor: Gan-Lin Hwang, Tainan (TW)

(73) Assignee: Iidustrial Technology Research Institute (TW)

( * ) Notice: Subject to any disclaimer, the term of this patent is extended or adjusted under 35 U.S.C. 154(b) by 471 days.

(21) Appl. No.: 10/255,669

(22) Filed: Sep. 27, 2002

(65) Prior Publication Data
US 2003/0159917 A1 Aug. 28, 2003

(30) Foreign Application Priority Data
Feb. 27, 2002 (TW) .............................. 91103635 A

(51) Int. Cl.
*B01J 19/08* (2006.01)
(52) U.S. Cl. .................... 204/164; 423/445 B
(58) Field of Classification Search ............... 204/173, 204/164; 423/445 B
See application file for complete search history.

(56) References Cited

U.S. PATENT DOCUMENTS

| | | | | |
|---|---|---|---|---|
| 5,227,038 A | * | 7/1993 | Smalley et al. | 204/173 |
| 5,560,898 A | * | 10/1996 | Uchida et al. | 423/461 |
| 5,641,466 A | * | 6/1997 | Ebbesen et al. | 423/447.2 |
| 5,648,056 A | * | 7/1997 | Tanaka | 423/445 B |
| 6,426,134 B1 | * | 7/2002 | Lavin et al. | 428/300.1 |
| 6,602,485 B1 | * | 8/2003 | Tsuboi | 423/445 R |
| 7,008,605 B1 | * | 3/2006 | Benavides | 423/447.1 |

* cited by examiner

*Primary Examiner*—Kishor Mayekar
(74) *Attorney, Agent, or Firm*—Sughrue Mion, PLLC

(57) ABSTRACT

A method of producing hollow carbon nanocapsules. First, an arc chamber including a graphitic cathode and a graphitic anode is provided and an inert gas is introduced into the arc chamber. Next, a voltage is applied across the cathode and the anode by a pulse current with the voltage sufficient to generate a carbon arc reaction between the cathode and the anode. Finally, deposit formed on the cathode is collected. The deposit includes a hollow carbon nanocapsule main product and a carbon nanotube byproduct.

19 Claims, 4 Drawing Sheets

PREPARATION OF HOLLOW CARBON NANOCAPSULES

BACKGROUND OF THE INVENTION

1. Field of the Invention

The present invention relates to a method for producing hollow carbon nanocapsules, and more particularly to a method for producing high purity hollow carbon nanocapsules.

2. Background of the Invention

A hollow carbon nanocapsule is a polyhedral carbon cluster constituted by multiple graphite layers having a balls-within-a ball structure. The diameter of a hollow carbon nanocapsule is about 3–60 nm. Hollow carbon nanocapsules have special fullerene structure and optoelectronic properties and can be utilized in various fields such as medicine (medical grade active carbon), light and heat absorption, electromagnetic shielding, organic light emitting materials, solar energy receivers, catalysts, sensors, carbon electrodes in lithium batteries, nanoscale composite materials with thermal conductivity and special electrical properties, and nanoscale carbon powder for printing.

However, a process for producing high purity carbon nanocapsules has not yet been described in conventional literature. Only a trace amount of hollow carbon nanocapsules has been found when producing carbon nanotubes. Moreover, by conventional process, the main product is long carbon nanotubes, and there is a strong van der Waals force between carbon nanocapsules and carbon nanotubes. Therefore, it is not easy to isolate carbon nanocapsules. The related application on carbon nanocapsules is limited and insufficient.

U.S. Pat. No. 6,063,243 discloses a process for producing carbon nanotubes as a main product with a nanoparticle byproduct. This patent uses direct current to conduct an arc discharge reaction.

German Patent No. 19740389 uses a laser beam evaporated catalytic process to produce carbon nanofibers, carbon nanoparticles, and fullerene. The process has high cost and low yield, and the product is not easy to purify.

SUMMARY OF THE INVENTION

The object of the present invention is to provide, for the first time, a method for producing high purity hollow carbon nanocapsules.

To achieve the above-mentioned object, the inventive method for producing high purity hollow carbon nanocapsules includes the following steps. An arc chamber including a graphitic cathode and a graphitic anode is provided and an inert gas is introduced into the arc chamber. A voltage is applied across the cathode and the anode by a pulse current with the voltage sufficient to generate a carbon arc reaction between the cathode and the anode. Finally, deposit formed on the cathode is collected. The deposit includes a hollow carbon nanocapsule main product and a carbon nanotube byproduct.

Moreover, after the collection step, the method of the present invention can further include the following purification steps. The deposit is dispersed in a solution using a surfactant. Next, the hollow carbon nanocapsule main product and the carbon nanotube byproduct are separated using column chromatography. Finally, the surfactant is removed from the hollow carbon nanocapsules using rotational centrifugation.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The present invention uses pulse current under high pressure (above 1 atm) of an inert gas to undergo a carbon arc reaction. During the carbon arc reaction, the temperature at the electrode surface and the density of the carbon vapor are changed. Thus, the carbon nanocapsules obtained will have an improved yield.

Figure 1:
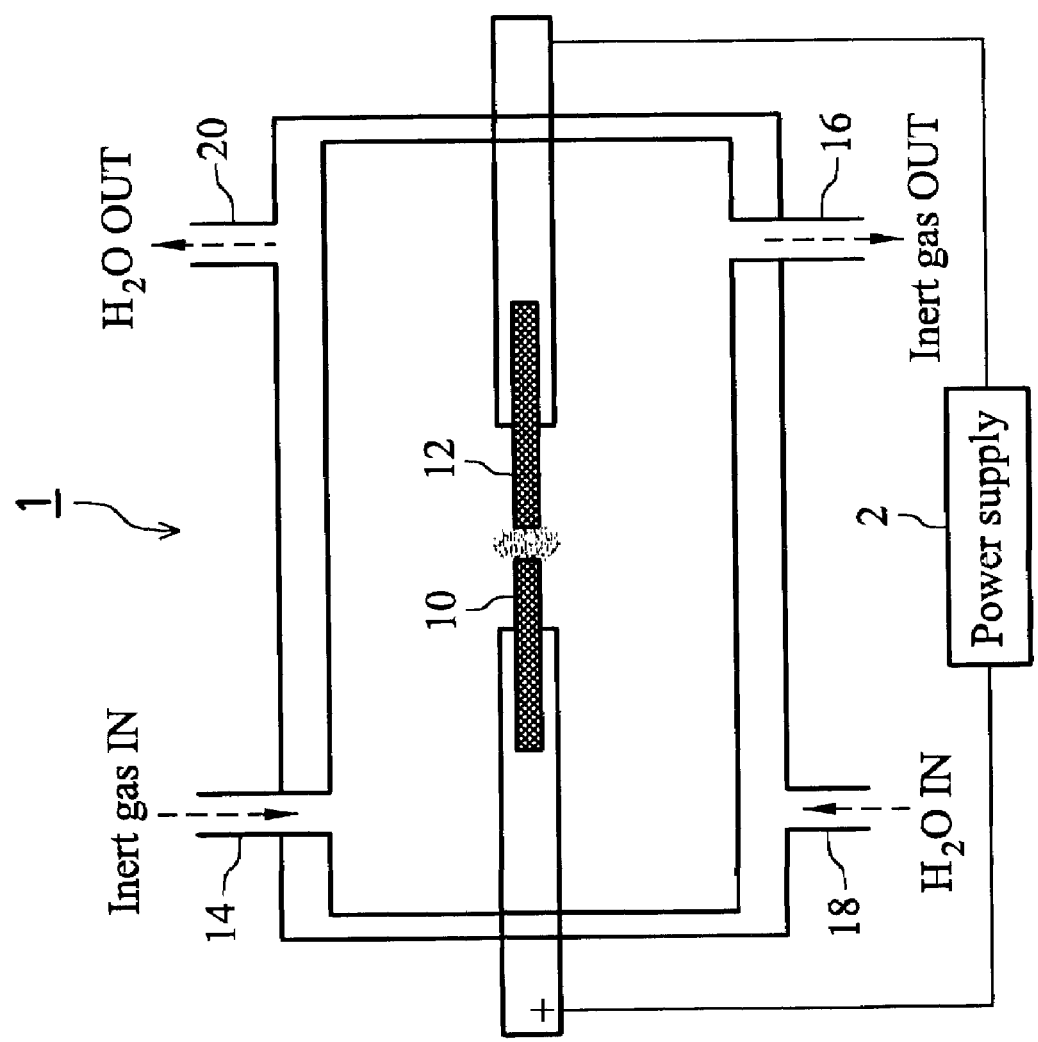
FIG. 1 shows a schematic diagram of an arc chamber according to the present invention.

FIG. 1 shows a schematic diagram of an arc chamber according to the present invention. Referring to FIG. 1, the arc chamber 1 includes at least a pair of electrodes 10 and 12 for carbon arc reaction. Inert gas is introduced into the arc chamber 1 via an inlet 14 and is expelled via an outlet 16. The arc chamber 1 is surrounded by flowing cooling water. Symbol 18 indicates a cooling water inlet, and symbol 20 a cooling water outlet.

In the present invention, the arc reaction is conducted under a flowing inert gas. The flow rate of the inert gas can be controlled to 30 to 120 $cm^3$/min, preferably 60 to 90 $cm^3$/min. Inert gas suitable for use in the present invention includes but is not limited to helium, argon, and nitrogen. The pressure of the arc chamber can be controlled to 1 to 10 arm, preferably 1 to 2 atm.

The electrodes 10 and 12 can be made of graphite. Generally, the electrodes 10 and 12 are in the form of a graphite rod. In the process of producing hollow carbon nanocapsules, electric energy is applied from a power supply 2 to the graphitic cathode 10 and graphitic anode 12. The electric energy applied has a voltage sufficient to generate a carbon arc reaction between the cathode 10 and the anode 12 and to form deposit on the graphitic cathode 10.

According to the main feature of the present invention, when performing the carbon arc reaction, a pulse current with a predetermined frequency applies a voltage across the cathode and anode. However, in the conventional techiques, DC (direct current) or AC (alternating current), rather than pulse current, is used to apply voltage. According to the present invention, the pulse current can have a frequency of 0.01 to 500 Hz, preferably 50 to 70 Hz. The current can be controlled to 50 to 500 A, and the voltage between electrodes can be controlled to 10 to 30 V.

After the carbon arc reaction is conducted according to the above conditions, a deposit is formed on the cathode 10. According to the present invention, most of the obtained hollow carbon nanocapsules are present in the core portion of the deposit. Therefore, preferably, the core portion of the deposite on the cathode 10 is collected. The core portion of the deposite is black powder and is referred to as "crude product" in the following descriptions. The crude product includes hollow carbon nanocapsules main product (at least more than 50%) and short carbon nanotube byproduct. After further purification of the crude product, high purity hollow carbon nanocapsules are obtained. The purification process is described below. First, the crude product is dispersed in a solution using a surfactant. Then, the hollow carbon nanocapsules main product and the carbon nanotube byproduct in the solution are separated using column chromatography or a filter film. Finally, the surfactant is removed from the hollow carbon nanocapsules using rotational centrifugation. Hollow carbon nanocapsules having a purity higher than 95% are obtained.

Surfactant suitable for use in the present invention can be a cation surfactant such as cetyltrimethyl ammonium bromide, an anion surfactant such as sodium dedecyl sulfate, a zwitterion surfactant such as alkyl betaine, or a non-ionic surfactant such as lauryl alcohol ether. Preferable examples are certyltrimethyl ammonium bromide and sodium dedecyl sulfate. For column chromatography, the suitable column can have size exclusion function. For example, the column can preferably have a filter film at the front, and the pore size of the filter film can be about 0.2 µm. In addition, rather than using column chromatography, a filter film can be singly used to perform separation. When a filter film is used for separation, several filterings can be performed to achieve better separation.

Compared with conventional techniques, the present invention includes at least the following advantages:

1. The present invention is the only currently available way to obtain high purity hollow carbon nanocapsules.

2. According to the present invention, the crude product (the core portion of the deposit on the cathode) includes about 70% hollow carbon nanocapsules and about 30% short carbon nanotubes. Since long carbon nanotubes that are not easily dispersed are not present, the crude product can be easily dispersed in liquid phase. Thus, a simple and non-destructive method can be used to purify the crude product. It is advantageous for exploitation.

3. The process of the present invention produces hollow carbon nanocapsules at low cost, and the crude product is easy to purify. Therefore, the process of the present invention has potential to replace the conventional carbon nanotube production process.

The following example is intended to illustrate the process and the advantages of the present invention more fully without limiting its scope, since numerous modifications and variations will be apparent to those skilled in the art.

EXAMPLE

This example uses the arc chamber shown in FIG. 1 to prepare hollow carbon nanocapsules. Two graphite rods were used as a cathode and anode and have a diameter of 0.24 inches. The cathode was shorter and 8–10 cm long. Argon was introduced into the arc chamber at 60–90 $cm^3$/min. The pressure of the arc chamber was controlled to 1.2 atm. The arc chamber was surrounded by flowing cooling water.

Figure 2:
FIG. 2 is a TEM photograph of the hollow carbon nanocapsules crude product of the present invention.

A carbon arc reaction was performed under the following conditions: a pulse current of about 60 Hz, voltage of about 20 V, and electric current of about 100 A. The carbon arc reaction proceeded for about 30 minutes and then stopped. A deposit was formed on the cathode. The deposit was about 3–4 cm long and had the same diameter as the graphitic cathode. The deposit was cut and a black powdery crude product was obtained in the core portion of the deposit. The crude product contained about 70% hollow carbon nanocapsules, 30% short carbon nanotubes, and a trace of carbon particles. FIG. 2 is a TEM (transmission electron microscopy) photograph of the hollow carbon nanocapsule crude product.

Figure 3:
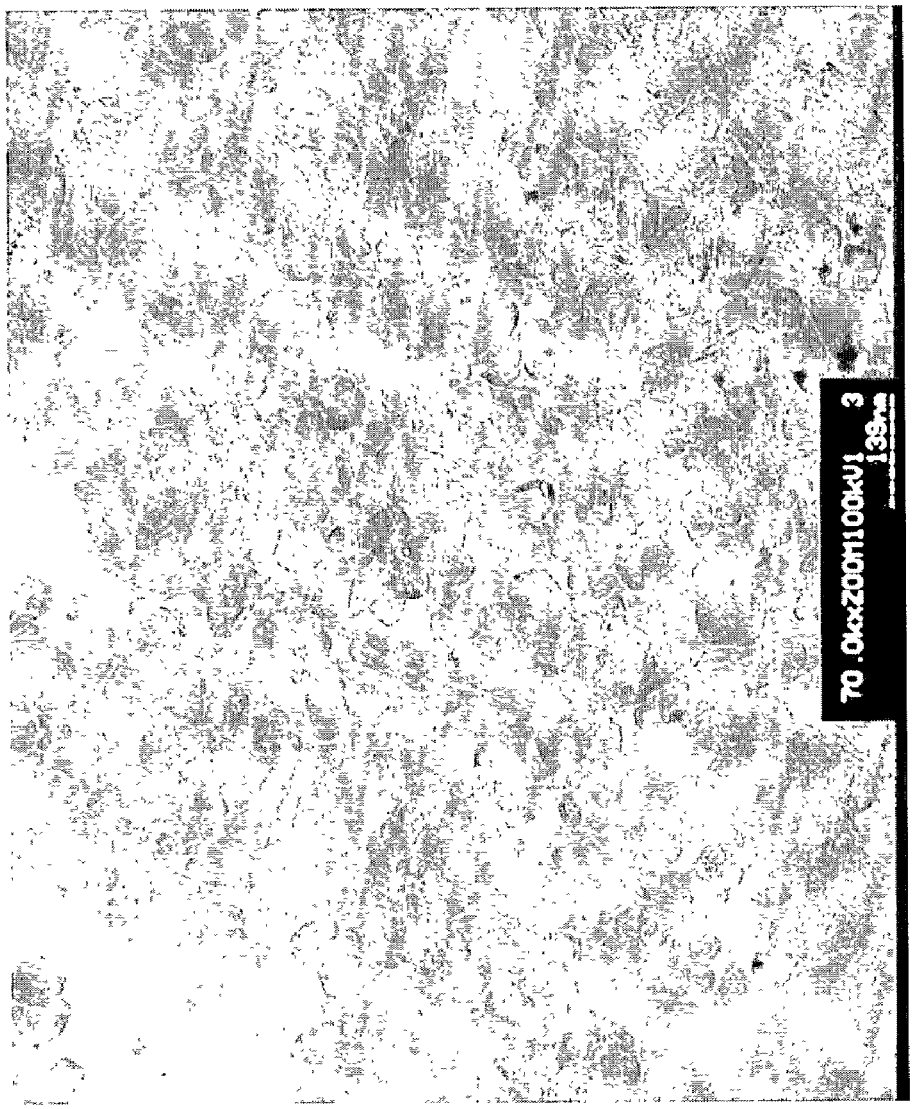
FIG. 3 is a TEM photograph of the purified hollow carbon nanocapsules of the present invention.
Figure 4:
FIG. 4 is a high resolution TEM photograph of the purified hollow carbon nanocapsules of the present invention.

The crude product was dispersed in a solution using a surfactant. Then, the dispersion solution was subjected to column chromatography to separate the hollow carbon nanocapsules and carbon nanotubes. Finally, the surfactant was removed from the hollow carbon nanocapsules using high speed centrifugation. The hollow carbon nanocapsules obtained had higher than 95% purity. FIG. 3 is a TEM photograph of the purified hollow carbon nanocapsules. FIG. 4 is a high resolution TEM photograph of the purified hollow carbon nanocapsules.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of producing hollow carbon nanocapsules, comprising the steps of:
    (a) providing an arc chamber comprising a graphitic cathode and a graphitic anode, and introducing an inert gas into the arc chamber;
    (b) applying a voltage across the cathode and the anode by a pulse current, the voltage sufficient to generate a carbon arc reaction between the cathode and the anode, wherein the pulse current has a frequency of 50 to 70 Hz; and
    (c) collecting deposit formed on the cathode, wherein the deposit includes at least more than 50% of a hollow carbon nanocapsule main product.

2. The method as claimed in claim 1, wherein the inert gas has a flow rate of 30 to 120 $cm^3$/min.

3. The method as claimed in claim 1, wherein the arc chamber has a pressure of 1 to 10 atm.

4. The method as claimed in claim 1, wherein the graphitic cathode and graphitic anode are in the form of graphite rods.

5. The method as claimed in claim 1, wherein the carbon arc reaction is conducted at a voltage of 10 to 30 V, and at a current of 50 to 500 A.

6. The method as claimed in claim 1, wherein step (c) is conducted by cutting the deposit to collect only a core portion of the deposit deposited on the cathode.

7. A method of producing hollow carbon nanocapsules, comprising the steps of:
    (a) providing an arc chamber comprising a graphitic cathode and a graphitic anode, and introducing an inert gas into the arc chamber;
    (b) applying a voltage across the cathode and the anode by a pulse current, the voltage sufficient to generate a carbon arc reaction between the cathode and the anode, wherein the pulse current has a frequency of 50 to 70 Hz;

(c) collecting deposit formed on the cathode, the deposit including at least more than 50% of a hollow carbon nanocapsule main product and a carbon nanotube byproduct; and (d) separating and purifying the deposit to obtain the hollow carbon nanocapsules.

8. The method as claimed in claim 7, wherein the inert gas has a flow rate of 30 to 120 cm$^3$/min.

9. The method as claimed in claim 7, wherein the arc chamber has a pressure of 1 to 10 atm.

10. The method as claimed in claim 7, wherein the carbon arc reaction is conducted at a voltage of 10 to 30 V, and at a current of 50 to 500 A.

11. The method as claimed in claim 7, wherein step (c) is conducted by cutting the deposit to collect only a core portion of the deposit formed on the cathode.

12. The method as claimed in claim 7, wherein step (d) includes:

(d1) dispersing the deposit in a solution using a surfactant;

(d2) separating the hollow carbon nanocapsules main product and the carbon nanotube byproduct using column chromatography; and (d3) removing the surfactant from the hollow carbon nanocapsules using rotational centrifugation.

13. The method as claimed in claim 12, wherein the surfactant is a cation surfactant, anion surfactant, zwitterion surfactant, or non-ionic surfactant.

14. The method as claimed in claim 12, wherein the surfactant is cetyltrimethyl ammonium bromide or sodium dodecyl sulfate.

15. The method as claimed in claim 12, wherein step (d2) uses a column having a filter film at the front.

16. The method as claimed in claim 15, wherein the filter film has a pore size about 0.2 μm.

17. The method as claimed in claim 12, wherein the hollow carbon nanocapsules obtained from step (d3) have a purity higher than 95%.

18. The method as claimed in claim 7, wherein step (d) includes:

(d1) dispersing the deposit in a solution using a surfactant;

(d2) separating the hollow carbon nanocapsule main product and the carbon nanotube byproduct using a filter film; and (d3) removing the surfactant from the hollow carbon nanocapsules using rotational centrifugation.

19. The method as claimed in claim 18 wherein the filter film has a pore size about 0.2 μm.

* * * * *